(12) United States Patent
Kalinowski et al.

(10) Patent No.: US 11,597,419 B2
(45) Date of Patent: Mar. 7, 2023

(54) MODULAR PALLET JACK

(71) Applicant: Rehrig Pacific Company, Los Angeles, CA (US)

(72) Inventors: Dane Gin Mun Kalinowski, Foothill Ranch, CA (US); Philip A. King, Sugar Hill, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 17/513,501

(22) Filed: Oct. 28, 2021

(65) Prior Publication Data

US 2022/0048549 A1 Feb. 17, 2022

Related U.S. Application Data

(62) Division of application No. 17/126,162, filed on Dec. 18, 2020, now Pat. No. 11,440,572, which is a division of application No. 15/438,297, filed on Feb. 21, 2017, now Pat. No. 10,913,475.

(60) Provisional application No. 62/457,539, filed on Feb. 10, 2017, provisional application No. 62/298,395, filed on Feb. 22, 2016.

(51) Int. Cl.
*B62B 3/06* (2006.01)
*B62B 3/02* (2006.01)

(52) U.S. Cl.
CPC .................. *B62B 3/06* (2013.01); *B62B 3/02* (2013.01); *B62B 2203/20* (2013.01); *B62B 2205/006* (2013.01)

(58) Field of Classification Search
None
See application file for complete search history.

(56) References Cited

U.S. PATENT DOCUMENTS

| | | | |
|---|---|---|---|
| 2,784,004 A | 3/1957 | Hamrick, Jr. | |
| 3,499,398 A | 3/1970 | Murray | |
| 4,354,795 A * | 10/1982 | Dutra, Jr. .................. | B66F 9/18 410/52 |
| 7,165,776 B2 | 1/2007 | Quinlan, Jr. et al. | |
| 7,810,821 B2 | 10/2010 | Trine et al. | |
| 7,988,405 B2 | 8/2011 | Ellington | |
| 8,011,677 B1 | 9/2011 | Ellington et al. | |
| 8,075,244 B2 | 12/2011 | Ellington | |
| 8,282,111 B2 | 10/2012 | Hailston et al. | |
| 8,360,443 B2 | 1/2013 | Ellington | |
| 8,894,076 B2 | 11/2014 | Hailston et al. | |

(Continued)

FOREIGN PATENT DOCUMENTS

CN 104773193 A 7/2015

*Primary Examiner* — Mark C Hageman
(74) *Attorney, Agent, or Firm* — Carlson, Gaskey & Olds, P.C.

(57) ABSTRACT

A lift for a fork tine assembly includes a generally upright frame having at least one handle grip portion at a rearward portion thereof. The handle grip portion is fixed relative to the frame. A lift mechanism is secured to the frame. The lift mechanism is capable of attaching to and raising and lowering at least one fork tine. A plurality of wheels support the frame. The at least one fork tine may be part of a first fork tine assembly that can be selectively removed from the lift and replaced with a different configuration fork tine assembly. An optional shelf is provided on the frame for convenience but may be pivoted out of the way when not in use.

15 Claims, 11 Drawing Sheets

(56) References Cited

U.S. PATENT DOCUMENTS

| | | |
|---|---|---|
| 9,260,125 B2 | 2/2016 | Ellington et al. |
| 10,336,595 B2 * | 7/2019 | Matti ........................ B66F 9/18 |
| 10,793,173 B2 | 10/2020 | Kalinowski et al. |
| 2003/0197351 A1 * | 10/2003 | Burger ................ B66F 9/07504 |
| | | 280/651 |
| 2006/0231301 A1 | 10/2006 | Rose et al. |
| 2009/0183953 A1 | 7/2009 | Ellington |
| 2009/0185890 A1 | 7/2009 | Ellington |
| 2010/0295261 A1 | 11/2010 | Ellington |
| 2011/0064558 A1 | 3/2011 | Johnson |
| 2012/0319063 A1 | 12/2012 | Hailston et al. |
| 2013/0223962 A1 | 8/2013 | Ellington et al. |
| 2015/0021870 A1 * | 1/2015 | Lawrence ................. B62B 5/06 |
| | | 280/47.19 |
| 2018/0029623 A1 | 2/2018 | Kalinowski et al. |
| 2020/0391986 A1 | 12/2020 | Picha |

* cited by examiner

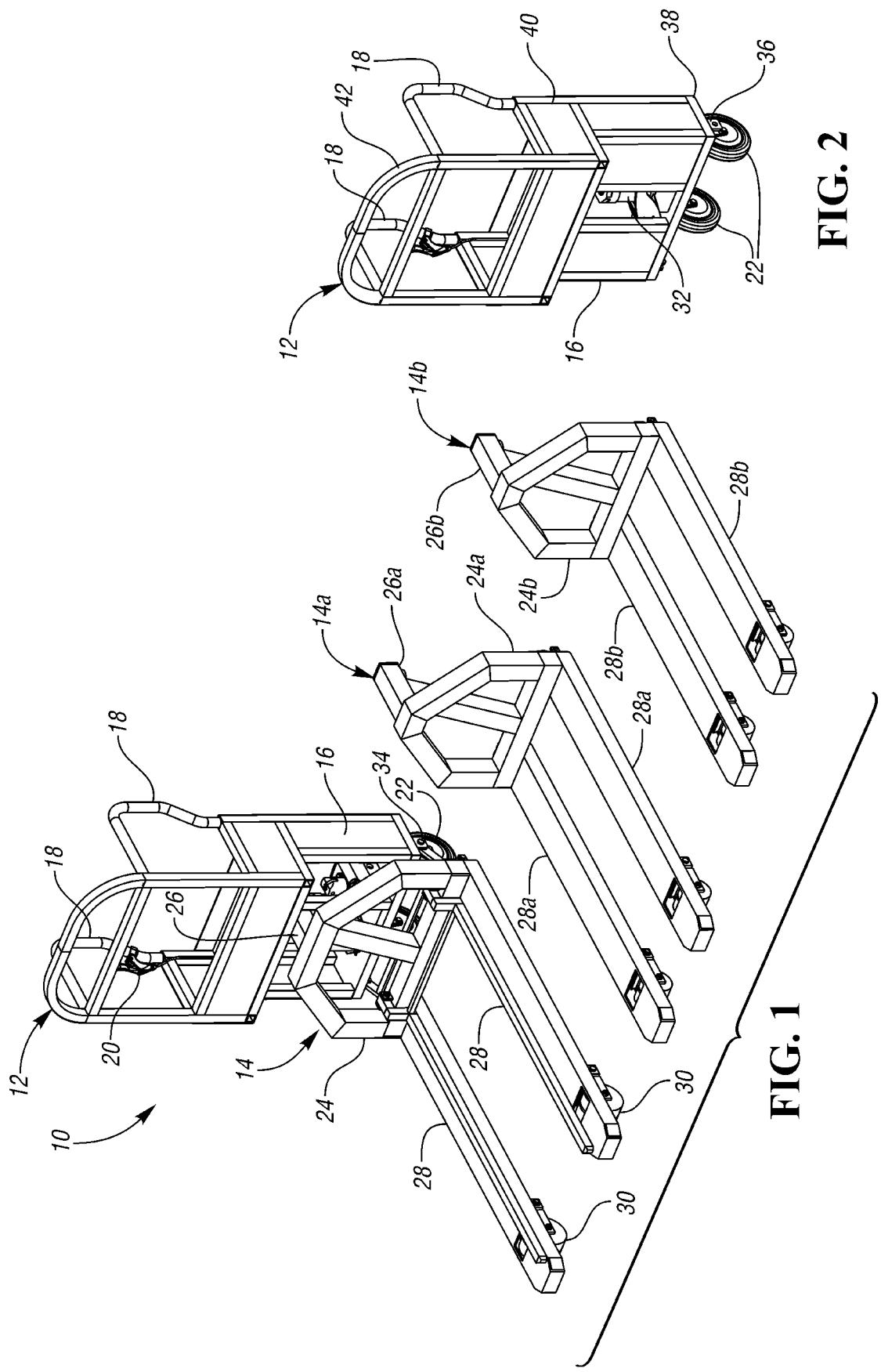

MODULAR PALLET JACK

BACKGROUND

Pallet lifts or pallet jacks are used to move pallets loaded with goods around a warehouse, store and/or in and out of trucks. Larger lifts can be used to move more pallets at one time; however, sometimes the larger lifts are too wide to be used in some applications. Some pallet jacks have long handles that pivot from a bottom rear edge of the base of the jack. The long handle can also make maneuvering in tight spaces more difficult.

SUMMARY

A lift for a fork tine assembly includes a generally upright frame having at least one handle grip portion at a rearward portion thereof. The handle grip portion is fixed relative to the frame. A lift mechanism is secured to the frame. The lift mechanism is capable of attaching to and raising and lowering at least one fork tine. A plurality of wheels support the frame. The at least one fork tine may be part of a first fork tine assembly that can be selectively removed from the lift and replaced with a different configuration fork tine assembly. An optional shelf is provided on the frame for convenience but may be pivoted out of the way when not in use.

A method for operating lift assembly includes: a) selectively connecting a first fork tine assembly to a lift; b) lifting and moving at least one pallet with the first fork tine assembly; c) after said steps a) and b), removing the first fork tine assembly from the lift; d) after said step c), selectively connecting a second fork tine assembly to the lift; and e) lifting and moving at least one pallet with the first fork tine assembly.

The first fork tine assembly may have a fork tine configuration that is different from the second fork tine assembly. The first fork tine assembly may have a number of fork tines that is different from the second fork tine assembly.

BRIEF DESCRIPTION OF THE DRAWINGS

FIG. 1 is a perspective view of a pallet jack assembly and a plurality of alternate fork tine assemblies for use in the pallet jack assembly.

FIG. 2 is a perspective view of the lift of FIG. 1.

DETAILED DESCRIPTION OF PREFERRED EMBODIMENTS

Figure 3:
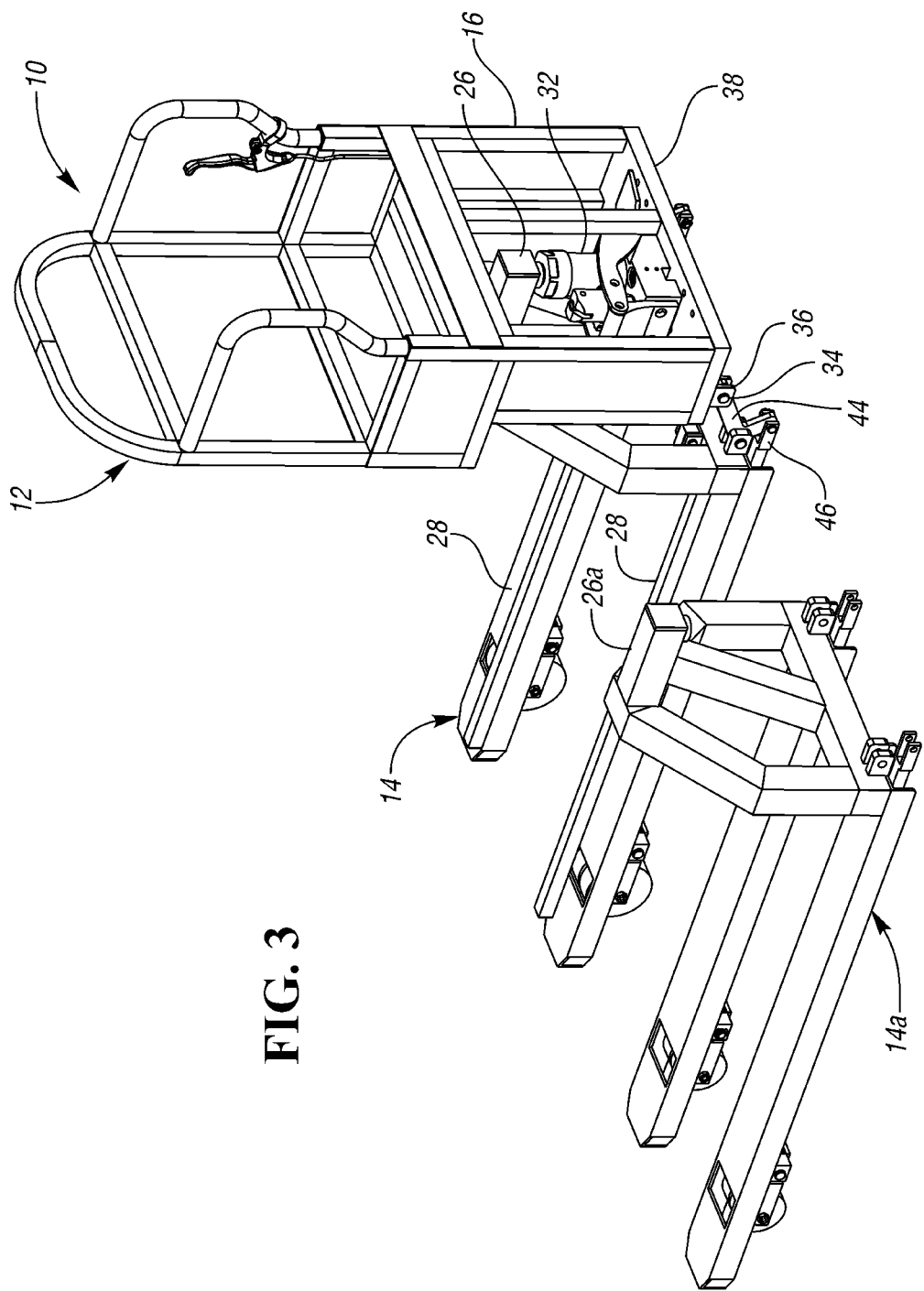
FIG. 3 is a rear perspective view of the lift assembly and one alternate fork tine assembly of FIG. 1.

A modular pallet jack or lift assembly 10 generally includes a lift 12 and a fork tine assembly 14. The lift 12 includes a frame 16 with upright handles 18. Other handle arrangements could also be used, but the upright handles 18 shown reduce the footprint of the lift assembly 10 and increase the maneuverability of the lift assembly 10 in tight spaces.

An actuator lever 20 proximate one of the handles 18 permits the operator to activate the lift 12. Wheels 22 are mounted below the frame 16.

The fork tine assembly 14 includes a support structure 24 having a connection beam 26 projecting rearward therefrom. The support structure 24 connects to the fork tines 28. The tines 28 are supported by pivoting wheels 30 (as is known). The tines 28 may have upper and lower portions connected in a known linkage arrangement. The lift 12 selectively lifts the connection beam 26, thereby lifting the upper portions of the tines 28 relative to lower portions of the tines 28 and causing the wheels 30 to pivot downward. The fork tine assembly 14 is also connected by bolts 34 to lower ends of the frame 16 of the lift 12.

The modular lift assembly 10 permits the lift 12 to be connected with any of a plurality of fork tine assemblies 14, 14a, 14b, as shown in FIG. 1. The fork tine assemblies 14, 14a, 14b in FIG. 1 each have a different spacing between the fork tines 28, 28a, 28b. Other different features could be provided by the alternate assemblies. Thus, the fork tine assemblies 14, 14a, 14b can be disconnected and swapped with another one of the fork tine assemblies, 14, 14a, 14b and later reconnected, as needed. This saves the cost of having to purchase multiple lift assemblies.

FIG. 2 shows the lift 12. The lift 12 houses the lift mechanism 32, such as hydraulic, electric, etc, lift mechanism 32. Panels on the frame 16 shield the lift mechanism 32 from view for an improved appearance and providing large surfaces for labeling or branding. An opening at the front of the lift 12 receives the connection beams 26, 26a, 26b of the fork tine assemblies 14, 14a, 14b. A pair of bolt eyelets 36 at the base 38 of the frame 16 are configured to receive the bolts 34 (FIG. 1) for connecting the fork tine assemblies 14, 14a, 14b. A pair of generally vertical support members 40 extend upward from rear corners of the base 38. The handles 18 are formed on portions of the generally vertical support members 40. An upper portion 42 of the frame 16 defines an upper edge of the lift 12.

FIG. 3 is a rear perspective view of the lift assembly 10 and fork tine assembly 14a of FIG. 1. The connection beam 26 is received on the lift mechanism 32. A pair of L-brackets 44 are pivotably connected at one end to the bolt eyelets 36 by bolts 34. The L-brackets 44 are each pivotably connected at their junction to the respective tine 28, and at the opposite end to a push rod 46 extending below the tine 28.

Figure 4:
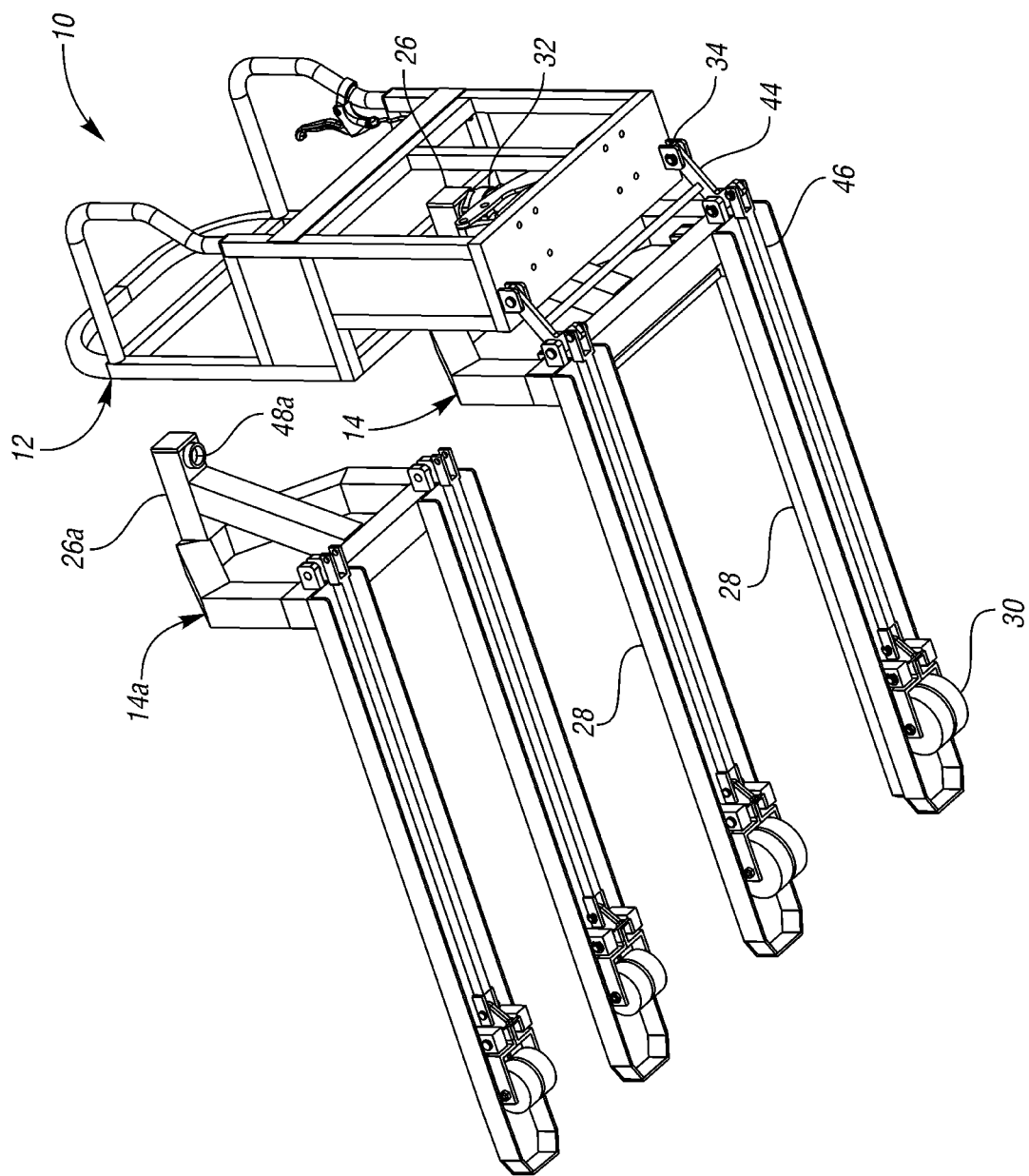
FIG. 4 is a bottom perspective view of the lift assembly and fork tine assembly of FIG. 3.

FIG. 4 is a bottom perspective view of the lift assembly 10 and fork tine assembly 14a of FIG. 3. As is known, the push rods 46 extend below each tine 28 to linkage adjacent the wheel 30. In use, when the actuator lever 20 is activated, the lift mechanism 32 lifts the connection beam 26. This raises the tines 28 and the junctions of the L-brackets 44 upward toward a position level with the base 38. This causes the L-brackets 44 to rotate, thereby driving push rods 46 forward toward the linkage of the wheels 30, pivoting wheels 30 downward and rearward. The tines 28 remain level as they are raised. As can be seen in FIG. 4, the connection beam 26a has a projection 48a projecting downward from the connection beam 26a. In this example, the projection 48a is cylindrical. The other connection beams 26, 26b, 26c, 26d are the same in this regard. The projection 48a is received in a socket (FIG. 2) at an upper end of the lift mechanism 32. Other connection mechanisms could be used.

Figure 5:
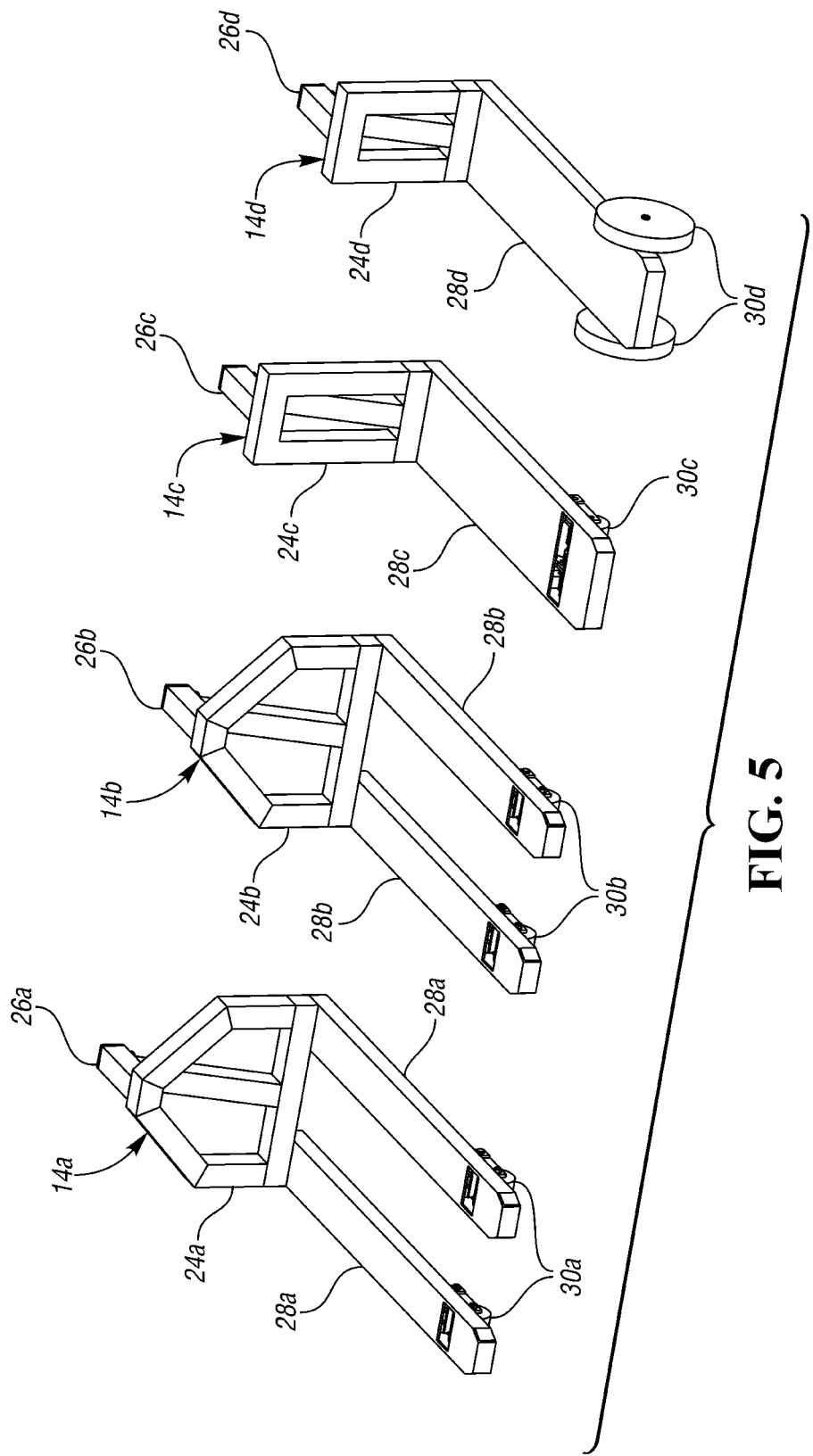
FIG. 5 shows two of the alternate fork tine assemblies plus two more fork tine assemblies that could be connected to the lift of FIG. 2.

FIG. 5 shows two of the alternate fork tine assemblies 14a, 14b, plus two more fork tine assemblies 14c, 14d that could be connected to the lift 12 of FIG. 2. As shown, the alternate fork tine assemblies can vary in tine spacing, number of tines, and wheel structure.

Figure 6:
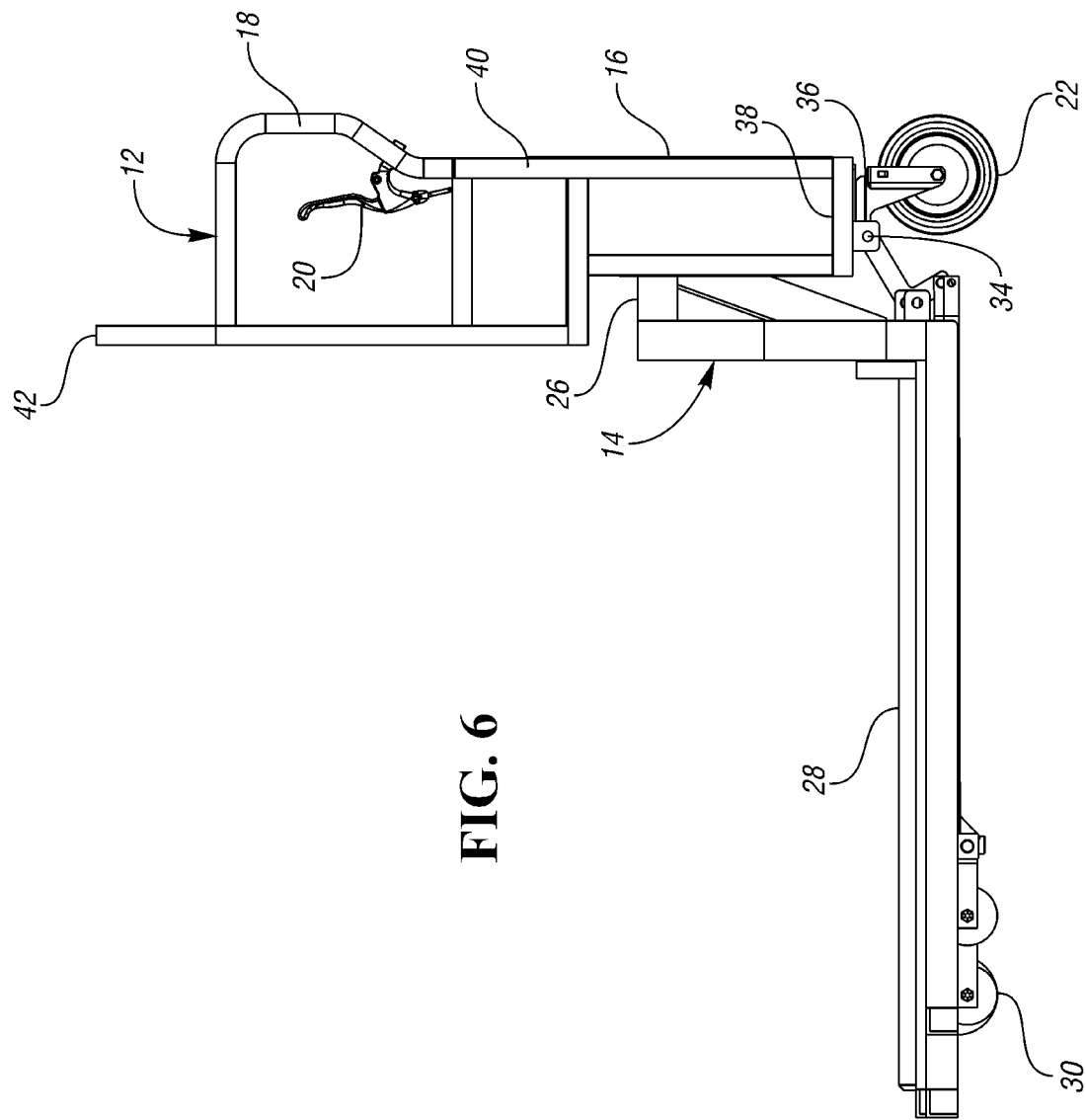
FIG. 6 is a side view of the pallet jack assembly of FIG. 1.

FIG. 6 is a side view of the pallet jack assembly 10 of FIG. 1. Again, the pair of bolt eyelets 36 at the base 38 of the frame 16 receive the bolts 34 for connecting the fork tine assembly 14. The generally vertical support members 40 extend upward from rear corners of the base 38. The handles 18 are formed on portions of the generally vertical support members 40. The actuator lever 20 is proximate one of the handles 18. The handles 18 are generally vertical and generally either within the footprint of the base 38 of the frame 16 or at least do not extend rearward of the frame 16 more than approximately 50% of the depth (front to back) of the base 38 of the frame 16. This is significantly less than the pallet jacks with long pivoting handles connected at rearward bottom portions of the frame, thus increasing the maneuverability of the pallet jack assembly 10.

Figure 7:
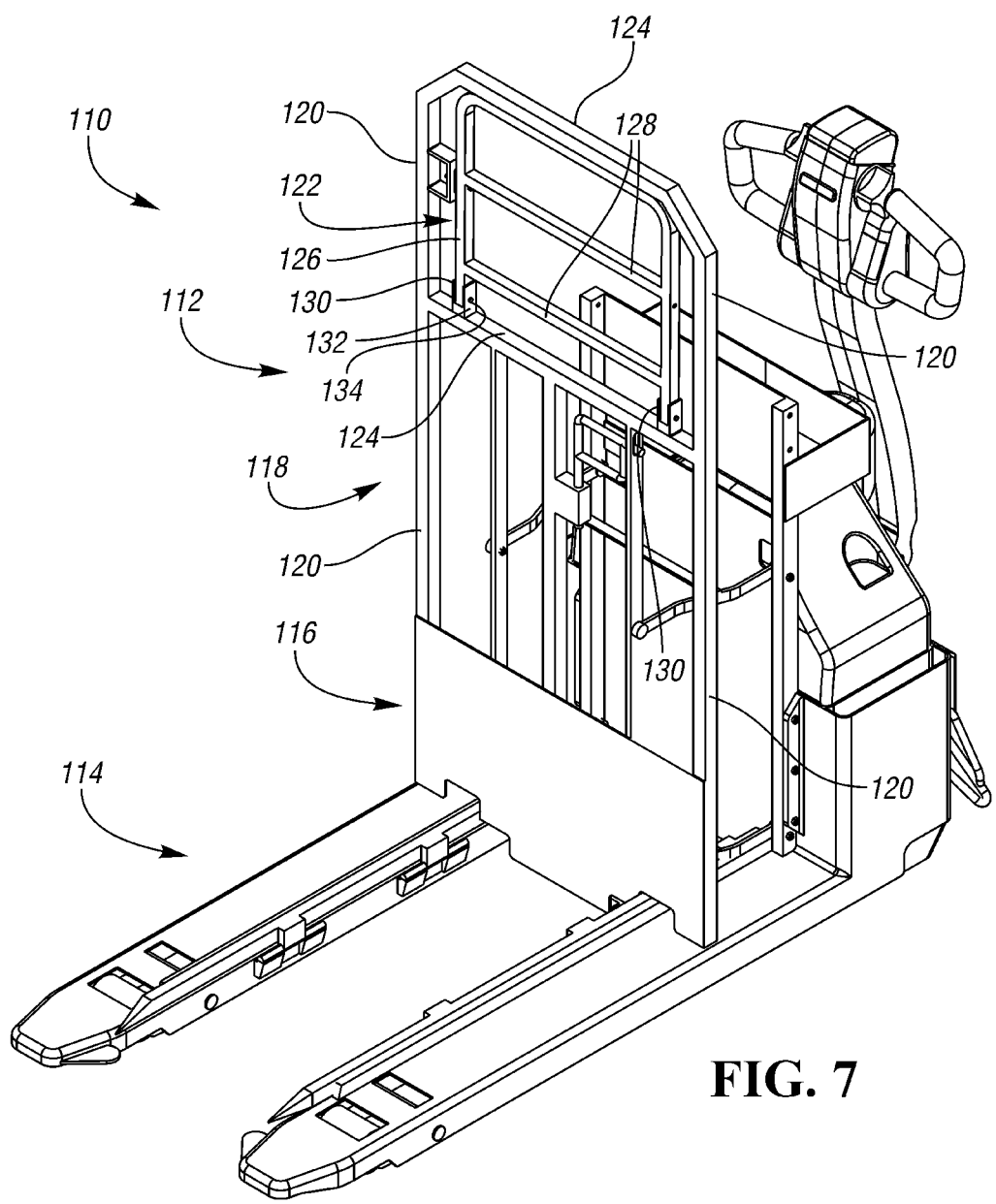
FIG. 7 illustrates a pallet jack or lift assembly according to another embodiment.

FIG. 7 illustrates a pallet jack or lift assembly 110 according to another embodiment having a deployable and stowable shelf 122. The shelf 122 could also be mounted to the pallet jack assembly 10 of FIGS. 1-6. The lift assembly 110 generally includes a lift 112 and a fork tine assembly 114. The lift 112 includes a frame 116 and an upper portion 118 extending upward from the frame 116. The frame 116 is located adjacent the fork tine assembly 114.

Figure 8:
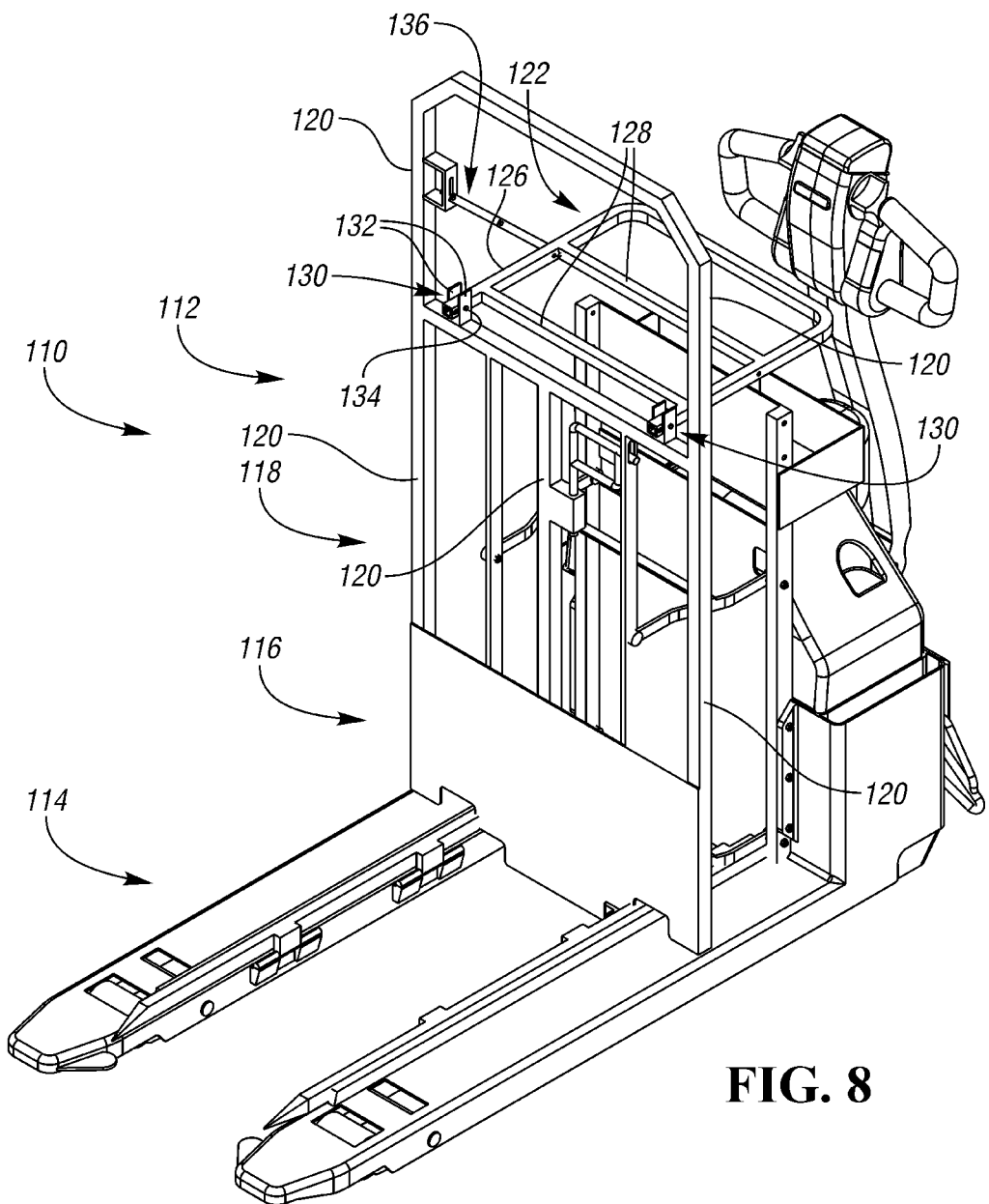
FIG. 8 illustrates the pallet jack of FIG. 7 with the shelf in the first deployed position.

At least one vertically extending reinforcement member 120 extends from the frame portion 116 and at least partially through the upper portion 118. The upper portion 118 includes a shelf 122 that is movable between a stowed position (FIG. 7) and a deployed position (FIG. 8). The shelf 122 is surrounded by a pair of the vertically extending reinforcement members 120 and a pair of generally horizontal reinforcement members 124. The shelf 122 is made up of a U-shaped member 126 and multiple cross members 128 extending across the U-shaped member 126. However, other configurations for the shelf 122 would be applicable to this disclosure.

Figure 9:
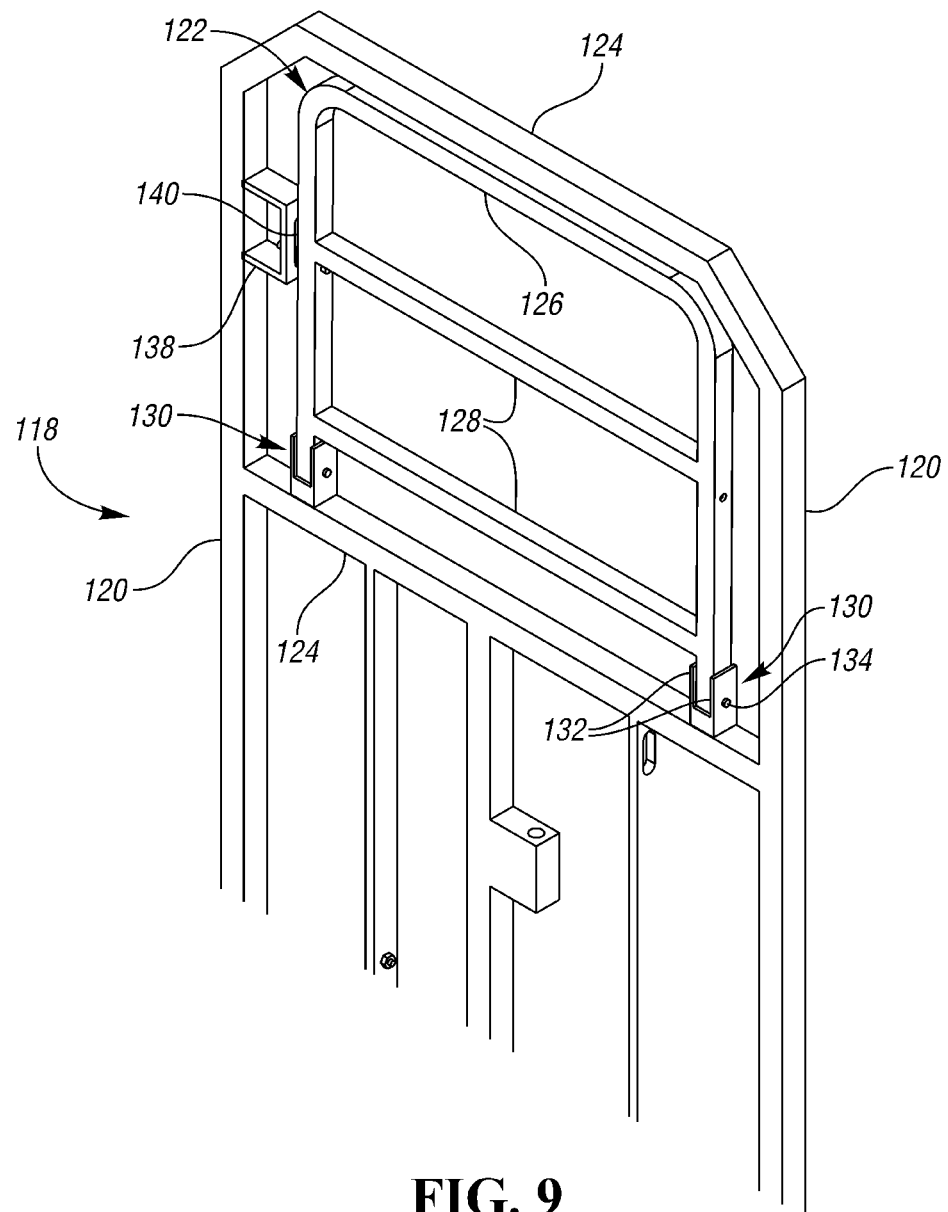
FIG. 9 is an enlarged view of the upper portion of the frame of the pallet jack of FIG. 7.
Figure 11:
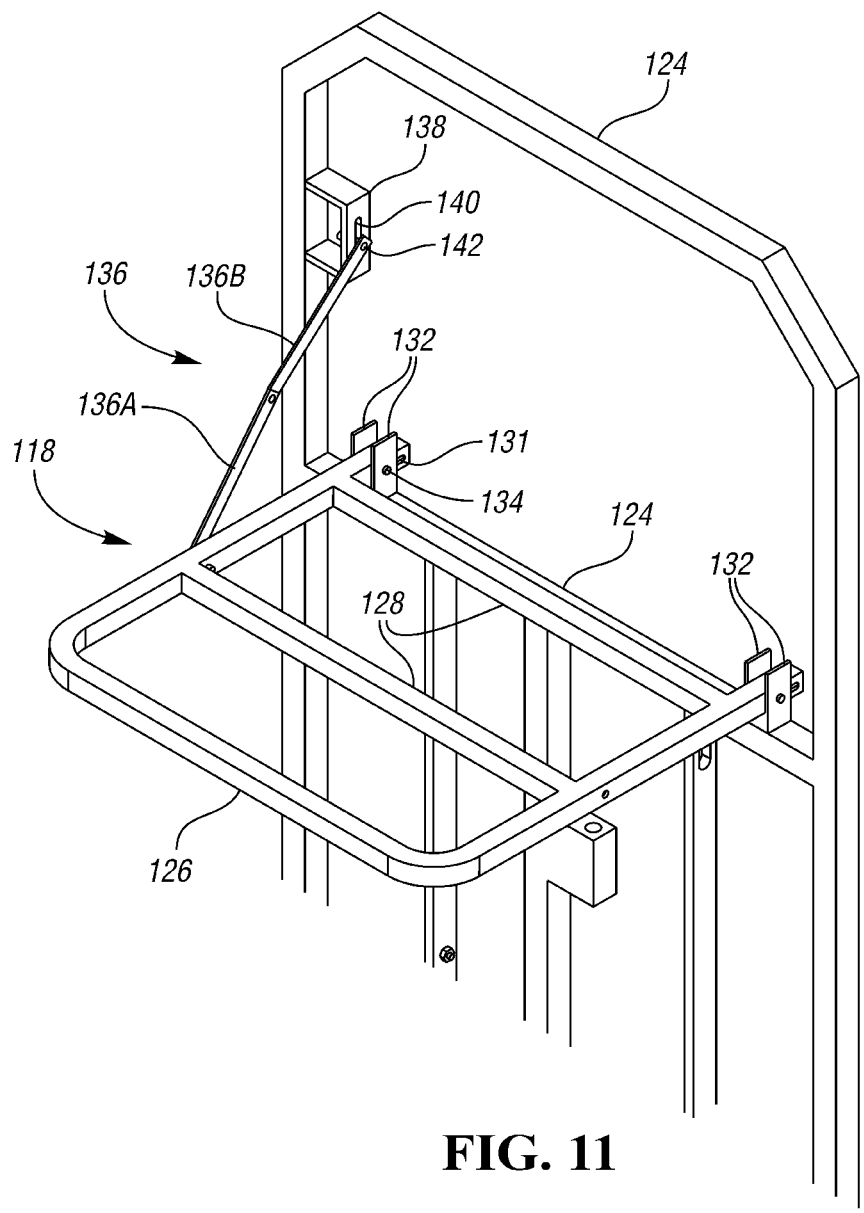
FIG. 11 shows the upper portion of the frame of FIG. 10 with the shelf in a second deployed position.
Figure 12:
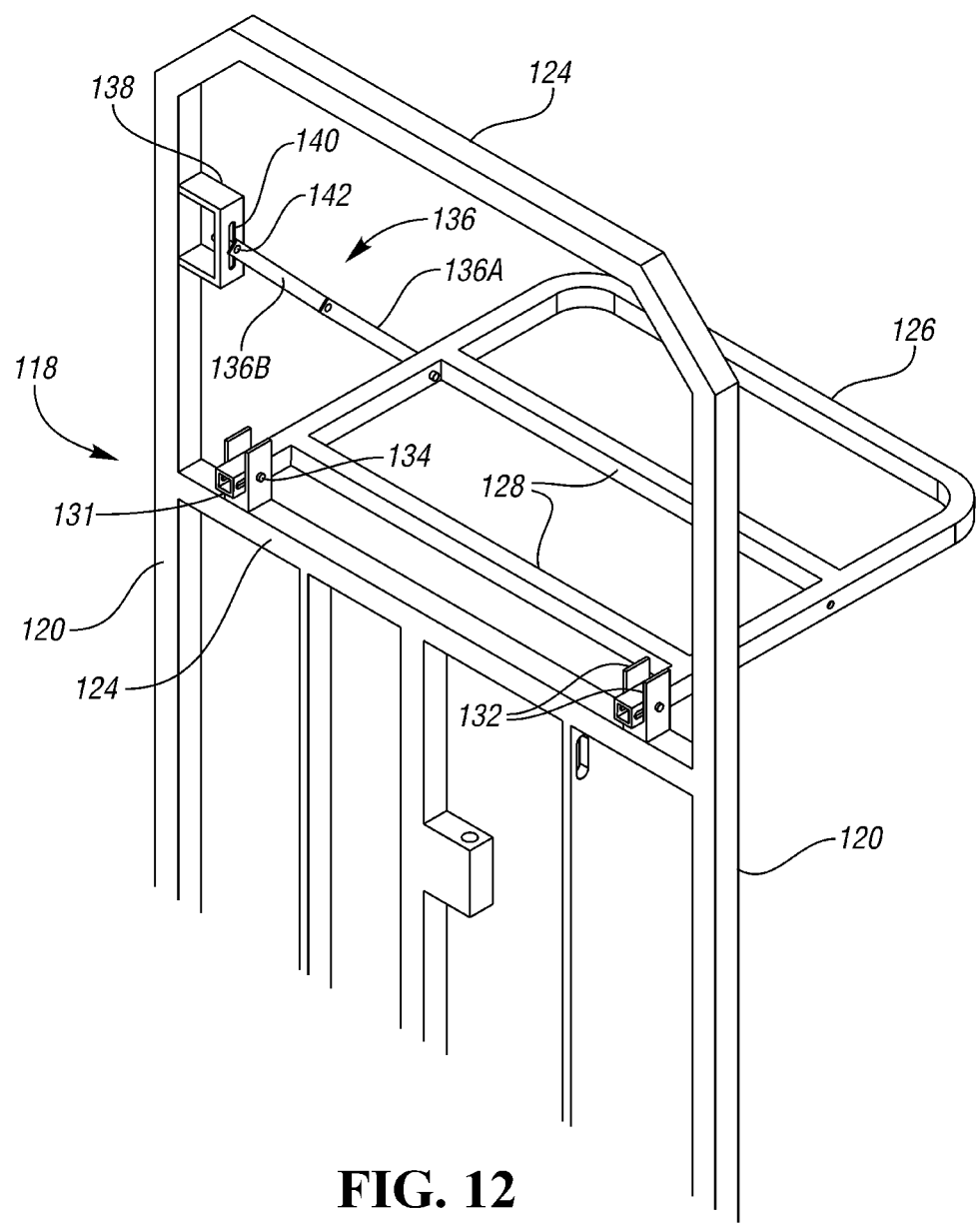
FIG. 12 shows the upper portion of the frame of FIG. 10 with the shelf in a first deployed position.

The shelf 122 is pivotably attached to the upper portion 118 by hinges 130. The hinges 130 secure the shelf 122 in the vertical stowed position and allow the shelf 122 to move to the deployed position. As shown in FIG. 9, the hinges 130 include a pair of arms 132 extending upward from the lower one of the generally horizontal reinforcement members 124 and an axle 134 extending between adjacent pairs of arms 134. Distal ends of the U-shaped member 126 include elongated slots 131 (FIGS. 11-12). Alternatively, the distal ends of the U-shaped member 126 could include the axle and the pair of arms 134 could include the slots.

Figure 10:
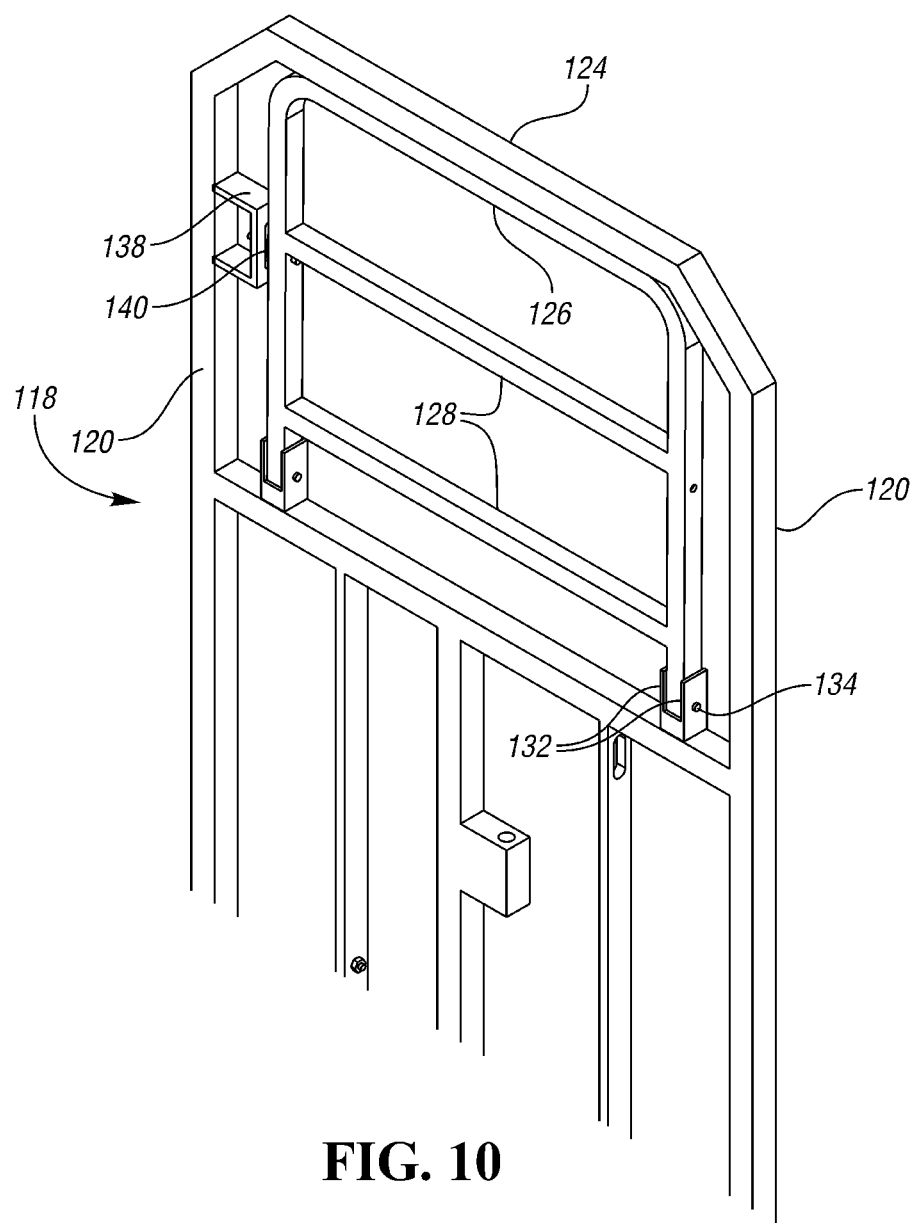
FIG. 10 shows the upper portion of the frame with the shelf lifted to the unlocked position.

The shelf 122 is moved from the stowed position to the deployed position by lifting up on the shelf 122 as shown in FIG. 10 which is allowed by the axle 134 moving through the slots 131 on the U-shaped member 126. The shelf 122 can then be pivoted forward (FIG. 11) or aft (FIG. 12).

A deployment arm 136 connects the shelf 122 to the upper portion 118 to maintain the shelf 122 in a generally horizontal configuration. The deployment arm 136 includes a first link 136A and a second link 136B. A first end of the first link 136A is pivotably attached to the shelf 122 and a first end of the second link 136B is pivotably and slidably attached to the upper portion 118 by a bracket 138. Second ends of the first and second link 136A, 136B are pivotably attached to each other. The bracket 138 includes a slot 140 for accepting a pin 142 located on the first end of the link 136B. The slot 140 allows the pin 142 and deployment arm 136 to move upward when the shelf 122 is moved in a vertical plane into and out of the stowed position. Although only a single deployment arm 136 and bracket 138 is shown, a second deployment arm 136 and bracket 138 could be located on the opposite side of the shelf 122.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A lift assembly comprising:
    a frame;
    an upper portion extending upward from the frame;
    a shelf pivotably secured to the upper portion, the shelf pivotable between a deployed position in which the shelf is oriented generally horizontally and a stowed position in which the shelf is oriented generally vertically;
    hinges connecting the shelf to the upper portion, wherein the shelf is retained in the stowed position by hinges, wherein the hinges are configured to release the shelf from the stowed position upon movement of the shelf in an upward direction relative to the upper portion;
    a lift mechanism secured to the frame, the lift mechanism capable of raising and lowering at least one fork tine; and
    at least one wheel supporting the frame.

2. The lift assembly of claim 1 wherein the shelf is pivotable relative to the upper portion by about 180 degrees.

3. The lift assembly of claim 1 wherein the shelf is pivotable relative to the upper portion by about 180 degrees.

4. The lift assembly of claim 1 wherein the lift assembly further includes a pair of fork tines and wherein the shelf is above the fork tines in the deployed position.

5. The lift assembly of claim 1 further including:
    a handle connected to the frame and positioned rearward of the frame; and
    fork tines extending forward of the frame.

6. The lift assembly of claim 5 wherein the shelf is above the fork tines in the deployed position.

7. A lift assembly comprising:
    a frame;
    an upper portion extending upward from the frame;
    a shelf pivotably secured to the upper portion, the shelf pivotable between a generally horizontal deployed position and a generally vertical stowed position, wherein the shelf is pivotable relative to the upper portion by about 180 degrees;
    a lift mechanism secured to the frame, the lift mechanism capable of raising and lowering at least one fork tine; and
    at least one wheel supporting the frame.

8. The lift assembly of claim 7 wherein the lift assembly further includes a pair of fork tines and wherein the shelf is above the fork tines in the generally horizontal deployed position.

9. The lift assembly of claim 8 further including:
    a handle connected to the frame and positioned rearward of the frame; and
    fork tines extending forward of the frame.

10. The lift assembly of claim 9 wherein the shelf is above the fork tines in the generally horizontal deployed position.

11. The lift assembly of claim 10 wherein the shelf is retained in the generally vertical stowed position by hinges.

12. The lift assembly of claim 11 wherein the hinges are configured to release the shelf from the generally vertical stowed position upon movement of the shelf in an upward direction relative to the upper portion.

13. A lift assembly comprising:
- a frame;
- an upper portion extending upward from the frame;
- a shelf pivotably secured to the upper portion, the shelf pivotable between a stowed position in which the shelf is oriented generally vertically and a deployed position in which the shelf is oriented generally horizontally, wherein the shelf is pivotable aft from the stowed position to the deployed position;
- a pair of tines extending forward of the frame;
- a lift mechanism secured to the frame, the lift mechanism capable of raising and lowering the pair of tines; and
- at least one wheel supporting the frame;
- wherein the shelf is also pivotable from the stowed position forward from the stowed position to a forward deployed position.

14. The lift assembly of claim 13 further including a deployment arm pivotably connected to the shelf and to the upper portion.

15. The lift assembly of claim 14 wherein the deployment arm includes a first link pivotably connected to a second link.

* * * * *